United States Patent
Hashimoto et al.

(10) Patent No.: US 11,024,832 B2
(45) Date of Patent: Jun. 1, 2021

(54) PACKAGING MATERIAL FOR CELL

(71) Applicant: DAI NIPPON PRINTING CO., LTD., Tokyo (JP)

(72) Inventors: Youhei Hashimoto, Tokyo (JP); Rikiya Yamashita, Tokyo (JP); Shunsuke Ueda, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 245 days.

(21) Appl. No.: 15/514,655

(22) PCT Filed: Sep. 28, 2015

(86) PCT No.: PCT/JP2015/077293
§ 371 (c)(1),
(2) Date: Mar. 27, 2017

(87) PCT Pub. No.: WO2016/052394
PCT Pub. Date: Apr. 7, 2016

(65) Prior Publication Data
US 2017/0229685 A1      Aug. 10, 2017

(30) Foreign Application Priority Data

Sep. 30, 2014  (JP) ................................. 2014-202456

(51) Int. Cl.
*B32B 27/32* (2006.01)
*H01M 2/02* (2006.01)
(Continued)

(52) U.S. Cl.
CPC ............ *H01M 2/0287* (2013.01); *B32B 7/02* (2013.01); *B32B 7/04* (2013.01); *B32B 7/12* (2013.01);
(Continued)

(58) Field of Classification Search
CPC ....... B32B 15/08; B32B 15/09; B32B 15/092; B32B 15/095; B32B 15/098;
(Continued)

(56) References Cited

U.S. PATENT DOCUMENTS 4,391,958 A * 7/1983 Minato ................. C07C 255/00
525/504
5,541,000 A * 7/1996 Hardy .................... C08G 59/18
428/413

(Continued)

FOREIGN PATENT DOCUMENTS

CN      102473866 A    5/2012
CN      102804446 A    11/2012
(Continued)

OTHER PUBLICATIONS

Machine Translation of WO 2013/069704 (Year: 2013).*
(Continued)

*Primary Examiner* — Zachary M Davis
(74) *Attorney, Agent, or Firm* — Oliff PLC

(57) ABSTRACT

A film-shaped packaging material for a cell in which a coating layer is provided as the outermost layer instead of a substrate layer and an adhesive layer in a conventional film-shaped packaging material for a cell, thereby making it possible to produce a thinner film; wherein the packaging material is provided with exceptional moldability and insulation performance and enables lead time to be reduced. The packaging material is a laminate having at least a coating layer, a barrier layer, and a sealant layer in the stated order, the coating layer including a single- or multiple-layer configuration formed by a cured product of a resin composition containing a heat-curable resin and curing accelerator, the laminate having a piercing strength of at least 5 N, as measured in compliance with JIS 1707:1997, and the coat- (Continued)

ing layer having a breakdown voltage of at least 1.0 kV, as measured in compliance with JIS C2110-1.

13 Claims, 1 Drawing Sheet

(51) Int. Cl.

| | |
|---|---|
| *B65D 65/40* | (2006.01) |
| *B32B 7/02* | (2019.01) |
| *B32B 27/20* | (2006.01) |
| *B32B 15/088* | (2006.01) |
| *B32B 27/28* | (2006.01) |
| *B32B 27/36* | (2006.01) |
| *B32B 7/12* | (2006.01) |
| *B32B 23/04* | (2006.01) |
| *B32B 15/092* | (2006.01) |
| *B32B 15/18* | (2006.01) |
| *B32B 7/04* | (2019.01) |
| *B32B 15/085* | (2006.01) |
| *B32B 15/095* | (2006.01) |
| *B32B 25/20* | (2006.01) |
| *B32B 15/082* | (2006.01) |
| *B32B 27/30* | (2006.01) |
| *B32B 27/08* | (2006.01) |
| *B32B 27/34* | (2006.01) |
| *B32B 25/18* | (2006.01) |
| *B32B 15/20* | (2006.01) |
| *B32B 27/42* | (2006.01) |
| *B32B 25/16* | (2006.01) |
| *B32B 27/40* | (2006.01) |
| *B32B 27/38* | (2006.01) |
| *B32B 15/09* | (2006.01) |
| *B32B 15/06* | (2006.01) |
| *B32B 15/098* | (2006.01) |
| *B32B 25/14* | (2006.01) |

(52) U.S. Cl.
CPC ............ *B32B 15/06* (2013.01); *B32B 15/082* (2013.01); *B32B 15/085* (2013.01); *B32B 15/088* (2013.01); *B32B 15/09* (2013.01); *B32B 15/092* (2013.01); *B32B 15/095* (2013.01); *B32B 15/098* (2013.01); *B32B 15/18* (2013.01); *B32B 15/20* (2013.01); *B32B 23/042* (2013.01); *B32B 25/14* (2013.01); *B32B 25/16* (2013.01); *B32B 25/18* (2013.01); *B32B 25/20* (2013.01); *B32B 27/08* (2013.01); *B32B 27/20* (2013.01); *B32B 27/281* (2013.01); *B32B 27/285* (2013.01); *B32B 27/306* (2013.01); *B32B 27/308* (2013.01); *B32B 27/32* (2013.01); *B32B 27/322* (2013.01); *B32B 27/34* (2013.01); *B32B 27/36* (2013.01); *B32B 27/365* (2013.01); *B32B 27/38* (2013.01); *B32B 27/40* (2013.01); *B32B 27/42* (2013.01); *B65D 65/40* (2013.01); *H01M 2/0277* (2013.01); *H01M 2/0285* (2013.01); *B32B 2250/02* (2013.01); *B32B 2250/03* (2013.01); *B32B 2270/00* (2013.01); *B32B 2307/206* (2013.01); *B32B 2307/302* (2013.01); *B32B 2307/31* (2013.01); *B32B 2307/50* (2013.01); *B32B 2307/71* (2013.01); *B32B 2307/714* (2013.01); *B32B 2307/7244* (2013.01); *B32B 2307/7246* (2013.01); *B32B 2307/732* (2013.01); *B32B 2307/746* (2013.01); *B32B 2307/752* (2013.01); *B32B 2457/10* (2013.01); *B32B 2457/16* (2013.01); *B32B 2553/00* (2013.01)

(58) Field of Classification Search
CPC ....... B32B 27/281; B32B 27/36; B32B 27/38; B32B 27/40; B32B 27/42; B32B 2255/06; H01M 2/0287; H01M 2/0292; H01M 2/00; H01M 2/02; H01M 2/0202; H01M 2/0257; H01M 2/026; H01M 2/0267; H01M 2/0275; H01M 2/0277; C08G 18/18; C08G 18/1808; C08G 59/4035; C08G 59/4042; C08G 59/50; C08G 59/5006; C08G 59/5026; C08G 59/5033; C08G 59/687
USPC ........ 427/388.1, 388.2, 409, 410; 428/425.8, 428/458, 460
See application file for complete search history.

(56) References Cited

U.S. PATENT DOCUMENTS

| | | | |
|---|---|---|---|
| 7,048,822 B2 | 5/2006 | Yamashita et al. | |
| 8,067,113 B2 | 11/2011 | Yamashita et al. | |
| 2007/0293636 A1* | 12/2007 | Kimura | C08G 18/12 525/453 |
| 2010/0015451 A1* | 1/2010 | Suzuta | B32B 15/08 428/424.8 |
| 2010/0040942 A1 | 2/2010 | Hatta et al. | |
| 2012/0135163 A1 | 5/2012 | Akita et al. | |
| 2012/0258354 A1* | 10/2012 | Yamaguchi | H01G 9/08 429/176 |
| 2014/0072864 A1 | 3/2014 | Suzuta et al. | |
| 2014/0205894 A1 | 7/2014 | Akita et al. | |
| 2015/0104593 A1* | 4/2015 | Minamibori | H01M 2/0287 428/35.7 |
| 2016/0049621 A1 | 2/2016 | Hashimoto et al. | |
| 2016/0056421 A1* | 2/2016 | Kim | H01M 2/0285 428/354 |
| 2016/0190525 A1 | 6/2016 | Akita et al. | |
| 2016/0211490 A1 | 7/2016 | Hashimoto et al. | |
| 2018/0040861 A1 | 2/2018 | Akita et al. | |

FOREIGN PATENT DOCUMENTS

| | | | | |
|---|---|---|---|---|
| CN | 103518272 A | 1/2014 | | |
| JP | 2001-202927 A | 7/2001 | | |
| JP | 2002-056823 A | 2/2002 | | |
| JP | 2007-173049 A | 7/2007 | | |
| JP | 20147131 A | 1/2014 | | |
| JP | 2015-084314 A | 4/2015 | | |
| JP | 2015-088451 A | 5/2015 | | |
| WO | WO-2013069704 A1 * | 5/2013 | ........... | B32B 15/088 |
| WO | 2014/156904 A1 | 10/2014 | | |

OTHER PUBLICATIONS

UPAC. Compendium of Chemical Terminology, 2nd ed. (the "Gold Book"). Compiled by A. D. McNaught and A. Wilkinson. Blackwell Scientific Publications, Oxford (1997). Online version (2019-) created by S. J. Chalk. ISBN 0-9678550-9-8. https://doi.org/10.1351/goldbook. (Year: 1997).*
Dec. 28, 2015 Search Report issued in International Patent Application No. PCT/JP2015/077293.
Apr. 11, 2019 Office Action issued in Chinese Application No. 201580053018.0.
Nov. 26, 2019 Office Action issued in Chinese Patent Application No. 201580053018.0.

* cited by examiner

PACKAGING MATERIAL FOR CELL

TECHNICAL FIELD

The present invention relates to a film-shaped battery packaging material which is made thin by providing a coating layer as an outermost layer on a barrier layer, the battery packaging material having excellent moldability and an insulation quality and being capable of reducing the lead time.

BACKGROUND ART

Various types of batteries have been developed heretofore, and in every battery, a packaging material is an essential member for sealing battery elements such as an electrode and an electrolyte therein. Metallic packaging materials have been often used heretofore as battery packaging materials.

On the other hand, batteries are required to be diversified in shape and to be thinned and lightened with improvement of performance of electric cars, hybrid electric cars, personal computers, cameras, mobile phones and so on. However, metallic battery packaging materials that have often been heretofore used have the disadvantage that it is difficult to keep up with diversification in shape, and there is a limit on weight reduction.

Thus, a film-shaped laminate including a base material layer, an adhesive layer, a barrier layer and a sealant layer in this order has been proposed as a battery packaging material which is easily processed into diverse shapes and which can be thinned and lightened (see, for example, Patent Document 1). Such a film-shaped battery packaging material is formed in such a manner that a battery element can be encapsulated by heat-welding the peripheral edge through heat sealing, with the sealant layers facing each other.

On the other hand, in recent years, demand for downsizing and thinning of batteries has been increasingly grown, and in conformity to the demand, further thinning of film-shaped battery packaging materials has been required. Examples of the method for thinning the whole of a film-shaped battery packaging material include a method in which a base material layer including a resin film having a thickness of about 10 to 20 μm is thinned. However, thinning of the resin film has limitations in terms of production, and also has the problem that the processing cost required for thinning of the resin film causes an increase in production cost of a battery packaging material.

A coating layer formed by applying a thermosetting resin can be considerably reduced in thickness as compared to the resin film, and therefore replacement of an adhesive layer and a base material layer, which are laminated on a barrier layer, by a coating layer formed of a thermosetting resin is effective for thinning the whole of a film-shaped battery packaging material.

However, when in place of an adhesive layer and a base material layer, a coating layer is formed using a thermosetting resin in a film-shaped battery packaging material, it is required to perform aging under a high-temperature condition for several days to several weeks as a curing step, and therefore the lead time is increased, so that product defects occur due to exposure to a high-temperature condition and a temperature change for a long period of time.

In recent years, there has been no shortage of demand for further improvement of battery performance, and accordingly, it has been required to increase the battery capacity. A film-shaped battery packaging material is processed into a predetermined shape by deep drawing molding etc. to seal a battery element therein, and therefore for increasing the battery capacity, the moldability of the film-shaped battery packaging material should be improved to increase the molding depth (extension during molding). A battery packaging material is also required to have an excellent insulation quality.

In view of these conventional techniques, a technique has been developed for achieving excellent moldability and insulation quality, and reducing the lead time in a battery packaging material which is made thin by providing a coating layer in place of an adhesive layer and a base material layer.

PRIOR ART DOCUMENT

Patent Document

Patent Document 1: Japanese Patent Laid-open Publication No. 2001-202927

SUMMARY OF THE INVENTION

Problems to be Solved by the Invention

An object of the present invention is to provide a film-shaped battery packaging material which is made thin by providing a coating layer as an outermost layer in place of an adhesive layer and a base material layer in a conventional film-shaped battery packaging material, the film-shaped battery packaging material having excellent moldability and insulation quality and being capable of reducing the lead time.

Means for Solving the Problems

The present inventors have extensively conducted studies for achieving the above-mentioned object, and resultantly found that when in a battery packaging material which includes a laminate including at least a coating layer, a barrier layer and a sealant layer in this order, the coating layer is configured to have a single layer or multiple layers formed of a cured product of a resin composition containing a thermosetting resin and a curing accelerator, the laminate has a piercing strength of 5 N or more as measured in accordance with JIS 1707:1997, and the coating layer has a dielectric breakdown voltage of 1.0 kV or more as measured in accordance with JIS C2110-1, unexpectedly moldability is improved, and the lead time can be reduced. The present inventors also have found that since the dielectric breakdown voltage of the coating layer that forms the battery packaging material is 1.0 kV or more, an insulation quality as a battery packaging material is effectively improved. The present invention has been completed by further conducting studies based on the above-mentioned findings.

That is, the present invention provides an invention of the aspects described below.
Item 1. A battery packaging material which is a laminate including at least a coating layer, a barrier layer and a sealant layer in this order,
wherein
the coating layer is configured to have a single layer or multiple layers formed of a cured product of a resin composition containing a thermosetting resin and a curing accelerator,
the laminate has a piercing strength of 5 N or more as measured in accordance with JIS 1707:1997, and the coating layer has a dielectric breakdown voltage of 1.0 kV or more as measured in accordance with JIS C2110-1.

Item 2. The battery packaging material according to item 1, wherein the coating layer has a three-layer structure in which a first coating layer, a second coating layer and a third coating layer are laminated in this order from an outermost surface side to the barrier layer side.

Item 3. The battery packaging material according to item 1 or 2, wherein the resin composition to be used for formation of at least one layer in the coating layer contains a pigment and/or dye.

Item 4. The battery packaging material according to item 3, wherein the resin composition to be used for formation of at least one layer in the coating layer contains an inorganic pigment.

Item 5. The battery packaging material according to any one of items 1 to 4, wherein the thermosetting resin is at least one selected from the group consisting of an epoxy resin, an amino resin, an acrylic resin, a urethane resin, a phenol resin, an unsaturated polyester resin, a polyimide resin and an alkyd resin.

Item 6. The battery packaging material according to any one of items 1 to 5, wherein the curing accelerator is at least one selected from the group consisting of an amidine compound, a carbodiimide compound, a ketimine compound, a hydrazine compound, a sulfonium salt, a benzothiazolium salt and a tertiary amine compound.

Item 7. The battery packaging material according to any one of items 1 to 6, wherein the barrier layer is metal foil.

Item 8. The battery packaging material according to any one of items 1 to 7, wherein the battery packaging material has a thickness of 40 to 120 µm as a whole.

Item 9. A method for producing the battery packaging material according to any one of items 1 to 8, the method including:

a coating layer forming step of applying a resin composition, which contains a thermosetting resin and a curing accelerator, onto a barrier layer and heating and curing the resin composition; and a step of laminating a sealant layer on a surface of the barrier layer on a side opposite to a surface on which the coating layer is laminated, before or after the coating layer forming step.

Item 10. A battery including a battery element including at least a positive electrode, a negative electrode and an electrolyte, the battery element being stored in the battery packaging material according to any one of items 1 to 8.

Item 11. A method for producing a battery, the method including:

a step of storing in a battery packaging material a battery element including at least a positive electrode, a negative electrode and an electrolyte, wherein the battery packaging material is a laminate including at least a coating layer, a barrier layer and a sealant layer in this order, the coating layer is configured to have a single layer or multiple layers formed of a cured product of a resin composition containing a thermosetting resin and a curing accelerator, the laminate has a piercing strength of 5 N or more as measured in accordance with JIS 1707:1997, and the coating layer has a dielectric breakdown voltage of 1.0 kV or more as measured in accordance with JIS C2110-1.

Item 12. Use, as a battery packaging material, of a laminate including at least a coating layer, a barrier layer and a sealant layer in this order, wherein the coating layer is configured to have a single layer or multiple layers formed of a cured product of a resin composition containing a thermosetting resin and a curing accelerator, the laminate has a piercing strength of 5 N or more as measured in accordance with JIS 1707:1997, and the coating layer has a dielectric breakdown voltage of 1.0 kV or more as measured in accordance with JIS C2110-1.

Advantages of the Invention

A battery packaging material according to the present invention includes a laminate including at least a coating layer, a barrier layer and a sealant layer in this order, and is not provided with an adhesive layer and a base material layer on the barrier layer which are provided in a conventional film-shaped battery packaging material. Therefore, the battery packaging material can be made thin, and can contribute to downsizing and thinning of batteries.

In the battery packaging material according to the present invention, the laminate that forms the battery packaging material has a piercing strength of 5 N or more as measured in accordance with JIS 1707:1997, and the coating layer has a dielectric breakdown voltage of 1.0 kV or more as measured in accordance with JIS C2110-1. Thus, excellent moldability and insulation quality can be imparted to the battery packaging material, and generation of cracks, pinholes and the like can be suppressed even when the molding depth during deep drawing molding is increased.

Since the dielectric breakdown voltage of the coating layer that forms the battery packaging material is 1.0 kV or more, an insulation quality as a battery packaging material is effectively improved.

Further, in the battery packaging material according to the present invention, the coating layer provided on the barrier layer is formed of a cured product of a resin composition containing a thermosetting resin and a curing accelerator, and therefore in a step of curing the coating layer, the layer can be cured in a short time without necessity of aging under a high-temperature condition. Thus, the lead time can be reduced, and further, occurrence of product defects due to exposure to a high-temperature condition for a long period of time can be prevented.

EMBODIMENT OF THE INVENTION

A battery packaging material according to the present invention is a laminate including at least a coating layer, a barrier layer and a sealant layer in this order, the coating layer is configured to have a single layer or multiple layers formed of a cured product of a resin composition containing a thermosetting resin and a curing accelerator, the laminate that forms the battery packaging material has a piercing strength of 5 N or more as measured in accordance with JIS 1707:1997, and the coating layer has a dielectric breakdown voltage of 1.0 kV or more as measured in accordance with JIS C2110-1. Hereinafter, the battery packaging material according to the present invention will be described in detail.

1. Laminated Structure of Battery Packaging Material

Figure 1:
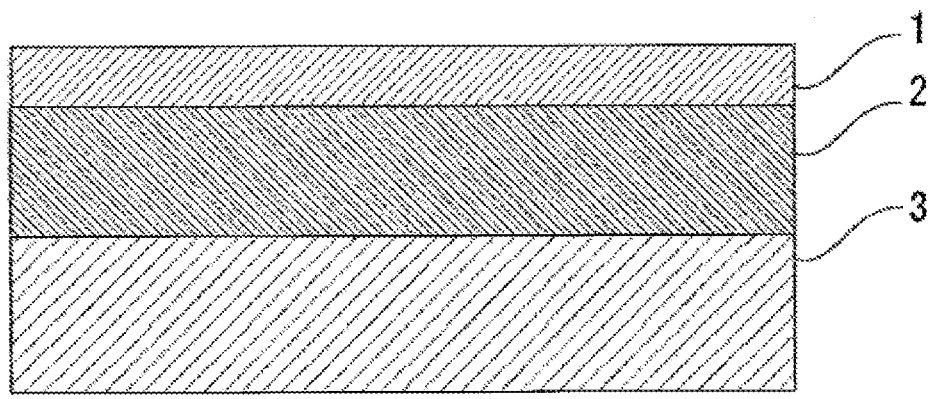
FIG. 1 is a drawing showing one example of a cross-sectional structure of a battery packaging material according to the present invention.

The battery packaging material according to the present invention has a laminated structure which includes a laminate including at least a coating layer 1, a barrier layer 2 and a sealant layer 3 in this order as shown in FIG. 1. In the battery packaging material according to the present invention, the coating layer 1 may be a single-layer, or a multi-layer having two or more layers.

Figure 2:
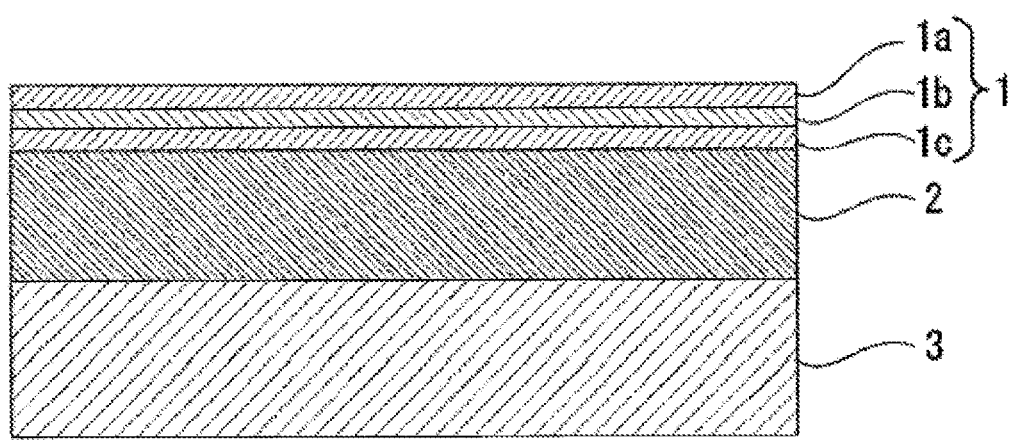
FIG. 2 is a drawing showing one example of a cross-sectional structure of a battery packaging material according to the present invention.

The coating layer 1 is preferably a multilayer having two or more layers, further preferably a multilayer having two or three layers, especially preferably a multilayer having three layers for allowing the coating layer 1 to have such a large thickness that a sufficient insulation quality can be imparted. FIG. 2 shows a laminated structure of the battery packaging material according to the present invention in which the coating layer 1 has a three-layer structure having a first coating layer 1a, a second coating layer 1b and a third coating layer 1c in this order from the outermost surface to the barrier layer 2 side.

In the battery packaging material according to the present invention, the coating layer 1 is an outermost surface layer, and the sealant layer 3 is an innermost layer. That is, at the time of assembling a battery, the sealant layer 3 situated on the periphery of a battery element is heat-welded with itself to hermetically seal the battery element therein, so that the battery element is encapsulated.

The battery packaging material according to the present invention may have an adhesive layer 4 provided between the barrier layer 2 and the sealant layer 3 as necessary for the purpose of improving adhesion between the layers.

2. Composition of Each Layer Forming Battery Packaging Material

[Coating Layer 1]

In the battery packaging material according to the present invention, the coating layer 1 is a layer that is provided on the barrier layer 2 and forms an outermost layer of the battery packaging material. The coating layer 1 is configured to have a single layer or multiple layers formed of a cured product of a resin composition containing a thermosetting resin and a curing accelerator. In the battery packaging material according to the present invention, the coating layer is a layer with which the battery packaging material is coated on the barrier layer side (side opposite to the sealant layer). The coating layer is a resin layer formed of a cured product of a resin composition containing a thermosetting resin and a curing accelerator. Further, in the battery packaging material according to the present invention, the piercing strength measured in accordance with JIS 1707:1997 is 5 N or more, and the coating layer has a dielectric breakdown voltage of 1.0 kV or more as measured in accordance with JIS C2110-1. As described above, in the battery packaging material according to the present invention, the piercing strength of the laminate that forms the battery packaging material, and the dielectric breakdown voltage of the coating layer 1 have values as described above, and thus unexpectedly, the moldability of the battery packaging material is dramatically improved, and further, the insulation quality of the battery packaging material can be improved.

For further improving the moldability and insulation quality of the battery packaging material, the piercing strength is preferably 9 N or more, further preferably 13 N or more. In the present invention, the "piercing strength" means a maximum stress value measured by a method conforming to the piercing strength test specified in JIS 1707:1997.

For further improving the moldability and insulation quality of the battery packaging material according to the present invention, the dielectric breakdown voltage of the coating layer is preferably 1.2 kV or more, further preferably 1.5 kV or more. When the dielectric breakdown voltage of the coating layer satisfies a value as described above, not only the moldability but also the insulation quality as a battery packaging material is improved, and therefore, for example, a plurality of batteries stored in the battery packaging material according to the present invention can be arranged, and suitably modularized.

Preferably, the following materials are used as the thermosetting resin and the curing accelerator that form the coating layer 1, for setting the piercing strength to the above-mentioned value and setting the dielectric breakdown voltage to the above-mentioned value in the battery packaging material according to the present invention.

(Thermosetting Resin)

The resin composition to be used for formation of the coating layer 1 contains a thermosetting resin. The thermosetting resin is not limited as long as it is polymerized when heated to form a high-molecular network structure, and cured. The thermosetting resin to be used for formation of the coating layer 1 is not particularly limited, and specific examples thereof include epoxy resins, amino resins (melamine resins, benzoguanamine resins and the like), polyimide resins, acrylic resins (thermosetting acrylic resins), urethane resins, phenol resins, unsaturated polyester resins and alkyd resins. These thermosetting resins may be used alone, or may be used in combination of two or more thereof.

Among these thermosetting resins, urethane resins, epoxy resins, acrylic resins and polyimide resins are preferred, two-liquid curable urethane resins and two-liquid curable epoxy resins are further preferred, with two-liquid curable urethane resins being especially preferred for further reducing the curing time of the coating layer 1, setting the piercing strength within the above-mentioned range, and setting the dielectric breakdown voltage to the above-mentioned value.

Specific examples of the two-liquid curable urethane resin include combinations of a polyol compound (main agent) and an isocyanate-based compound (curing agent), and specific examples of the two-liquid curable epoxy resin include combinations of an epoxy resin (main agent) and an acid anhydride, an amine compound or an amino resin (curing agent).

The polyol compound to be used as a main agent in the two-liquid curable urethane resin is not particularly limited, and examples thereof include polyester polyols, polyester polyurethane polyols, polyether polyols and polyether polyurethane polyols. These polyol compounds may be used alone, or may be used in combination of two or more thereof.

The isocyanate-based compound to be used as a curing agent in the two-liquid curable urethane resin is not particularly limited, and examples thereof include polyisocyanates, adducts thereof, isocyanurate-modified products thereof, carbodiimide-modified products thereof, allophanate-modified products thereof, and biuret-modified products thereof. Specific examples of the polyisocyanate include aromatic diisocyanates such as diphenylmethane diisocyanate (MDI), polyphenylmethane diisocyanate (polymeric MDI), toluene diisocyanate (TDI), hexamethylene diisocyanate (HDI), bis(4-isocyanatecyclohexyl)methane (H12MDI), isophorone diisocyanate (IPDI), 1,5-naphthalene diisocyanate (1,5-NDI), 3,3'-dimethyl-4,4'-diphenylene diisocyanate (TODI) and xylene diisocyanate (XDI); aliphatic diisocyanates such as tramethylene diisocyanate, hexamethylene diisocyanate, trimethylhexamethylene diisocyanate and isophorone diisocyanate; cycloaliphatic diisocyanates such as 4,4'-methylene-bis(cyclohexylisocyanate) and isophorone diisocyanate; and polyaromatic diisocyanates such as 1,5-naphthalene diisocyanate (1,5-NDI). Specific examples of the adduct include those obtained by adding trimethylolpropane, glycol or the like to the polyisocyanate. These isocyanate-based compounds may be used alone, or may be used in combination of two or more thereof.

Further excellent chemical resistance can be imparted when as a thermosetting resin, one having a polyaromatic backbone and/or a heterocyclic backbone is used in the coating layer 1 having a single-layer structure, or in the layer situated on the outermost side in the coating layer 1 having a multilayer structure. Specific examples of the thermosetting resin having a polyaromatic backbone include epoxy resins having a polyaromatic backbone, and urethane resins having a polyaromatic backbone. Examples of the thermosetting resin having a heterocyclic backbone include amino resins such as melamine resins and benzoguanamine resins. The thermosetting resin having a polyaromatic backbone and/or a heterocyclic backbone may be a one-liquid curable resin or a two-liquid curable resin.

More specific examples of the epoxy resin having a polyaromatic backbone include reactants of dihydroxynaphthalene and epihalohydrin; reactants of a condensate of naphthol and an aldehyde (naphthol novolac resin) and epihalohydrin; reactants of a condensate of dihydroxynaphthalene and an aldehyde, and epihalohydrin; reactants of a condensate of mono- or dihydroxynaphthalene and a xylylene glycol, and epihalohydrin; reactants of an adduct of mono- or dihydroxynaphthalene and a diene compound, and epihalohydrin; and reactants of a polynaphthol with naphthols coupled with each other, and epihalohydrin.

More specific examples of the urethane resin having a polyaromatic backbone include reactants of a polyol compound and an isocyanate-based compound having a polyaromatic backbone.

(Curing Accelerator)

The resin composition to be used for formation of the coating layer 1 contains a curing accelerator. When a thermosetting resin and a curing accelerator coexist as described above, the coating layer is quickly cured without requiring aging under a high-temperature condition during production, so that the lead time can be reduced.

Here, the "curing accelerator" is a substance that does not form a crosslinked structure by itself, but accelerates a crosslinking reaction of a thermosetting resin, or a substance that acts to accelerate a crosslinking reaction of a thermosetting resin, and may also form a crosslinked structure by itself.

The type of the curing accelerator is appropriately selected according to a thermosetting resin to be used so that the above-mentioned hardness can be achieved, and examples thereof include amidine compounds, carbodiimide compounds, ketimine compounds, hydrazine compounds, sulfonium salts, benzothiazolium salts and tertiary amine compounds.

The amidine compound is not particularly limited, and examples thereof include imidazole compounds, 1,8-diazabicyclo[5.4.0]undec-7-ene (DBU), 1,5-diazabicyclo[4.3.0]non-5-ene (DBN) and guanidine compounds. Specific examples of the imidazole compound include 2-methylimidazole, 2-ethylimidazole, 2-undecylimidazole, 2,4-dimethylimidazole, 2-heptadecylimidazole, 1,2-dimethylimidazole, 1,2-diethylimidazole, 2-ethyl-4-methylimidazole, 2-phenylimidazole, 1-benzyl-2-phenylimidazole, 1-cyanoethyl-2-methylimidazole, 1-cyanoethyl-2-undecylimidazole, 1-benzyl-2-methylimidazole, 2,4-diamino-6-[2'-methylimidazolyl-(1)']-ethyl-S-triazine, 2,4-diamino-6-[2'-ethyl-4'-methylimidazolyl-(1)']-ethyl-S-triazine, 2,4-diamino-6-[2'-undecylimidazolyl]-ethyl-S-triazine, 2,4-diamino-6-[2'-methylimidazolyl-(1)']ethyl-S-triazineisocyanuric acid adducts, 2-phenyl-4-methyl-5-hydroxymethylimidazole, 2-phenyl-4,5-dihydroxymethylimidazole and 2-aryl-4,5-diphenylimidazole. These amidine compounds may be used alone, or may be used in combination of two or more thereof.

The carbodiimide compound is not particularly limited, and examples thereof include N,N'-dicyclohexylcarbodiimide, N,N'-diisopropylcarbodiimide, 1-ethyl-3-(3-dimethylaminopropyl)carbodiimide, N-[3-(dimethylamino)propyl]-N'-ethylcarbodiimide, N-[3-(dimethylamino)propyl]-N'-ethylcarbodiimide methiodide, N-tert-butyl-N'-ethylcarbodiimide, N-cyclohexyl-N'-(2-morpholinoethyl)carbodiimide meso-p-toluenesulfonate, N,N'-di-tert-butylcarbodiimide and N,N'-di-p-tolylcarbodiimide. These carbodiimide compounds may be used alone, or may be used in combination of two or more thereof.

The ketimine compound is not particularly limited as long as it has a ketimine bond (N=C), and examples thereof include ketimine compounds obtained by reacting a ketone with an amine. Specific examples of the ketone include methyl ethyl ketone, methyl isopropyl ketone, methyl tertiary butyl ketone, methyl cyclohexyl ketone, diethyl ketone, ethyl propyl ketone, ethyl butyl ketone, dipropyl ketone, dibutyl ketone and diisobutyl ketone. Specific examples of the amine include aromatic polyamines such as o-phenylenediamine, m-phenylenediamine, p-phenylenediamine, m-xylylenediamine, diaminodiphenylmethane, diaminodiphenylsulfone and diaminodiethyldiphenylmethane; aliphatic polyamines such as ethylenediamine, propylenediamine, butylenediamine, diethylenetriamine, triethylenetetramine, tetraethylenepentamine, pentaethylenehexamine, hexamethylenediamine, trimethylhexamethylenediamine, 1,2-propanediamine, iminobispropylamine and methyliminobispropylamine; monoamines having an ether bond on the main chain and diamines having a polyether backbone, such as N-aminoethylpiperazine and 3-butoxyisopropylamine; cycloaliphatic polyamines such as isophoronediamine, 1,3-bisaminomethylcyclohexane, 1-cyclohexylamino-3-aminopropane, and 3-aminomethyl-3,3,5-trimethylcyclohexylamine; diamines having a norbornane backbone; polyamideamines having an amino group at the molecular end of a polyamide; and 2,5-dimethyl-2,5-hexamethylenediamine, mencenediamine and 1,4-bis(2-amino-2-methylpropyl)piperazine. These ketimine compounds may be used alone, or may be used in combination of two or more thereof.

The hydrazine compound is not particularly limited, and examples thereof include adipic acid dihydrazide and isophthalic acid dihydrazide. These hydrazine compounds may be used alone, or may be used in combination of two or more thereof.

The sulfonium salt is not particularly limited, and examples thereof include alkylsulfonium salts such as 4-acetophenyldimethylsulfonium hexafluoroantimonate, 4-acetophenyldimethylsulfonium hexafluoroarsenate, dimethyl-4-(benzyloxycarbonyloxy)phenyl sulfonium hexafluoroantimonate, dimethyl-4-(benzoyloxy)phenyl sulfonium hexafluoroantimonate and dimethyl-4-(benzoyloxy)phenyl sulfonium hexafluoroarsenate; benzyl sulfonium salts such as benzyl-4-hydroxyphenylmethylsulfonium hexafluoroantimonate, 4-acetoxyphenylbenzylmethylsulfonium hexafluoroantimonate, benzyl-4-methoxyphenylmethylsulfonium hexafluoroantimonate, benzyl-3-chloro-4-hydroxyphenylmethylsulfonium hexafluoroarsenate and 4-methoxybenzyl-4-hydroxyphenylmethylsulfonium hexafluorophosphate; dibenzylsulfonium salts such as dibenzyl-4-hydroxyphenylsulfonium hexafluoroantimonate, dibenzyl-4-hydroxyphenylsulfonium hexafluorophosphate, dibenzyl-4-methoxyphenylsulfonium hexafluoroantimonate and benzyl-4-methoxybenzyl-4-hydroxyphenylsulfonium hexafluorophosphate; and substituted benzylsulfonium salts such as p-chlorobenzyl-4-hydroxyphenylmethylsulfonium hexafluoroantimonate, p-nitrobenzyl-4-hydroxyphenylmethylsulfonium hexafluoroantimonate, 3,5-dichlorobenzyl-4-hydroxyphenylmethylsulfonium hexafluoroantimonate and o-chlorobenzyl-3-chloro-4-hydroxyphenylmethylsulfonium hexafluoroantimonate. These sulfonium salts may be used alone, or may be used in combination of two or more thereof.

The benzothiazolium salt is not particularly limited, and examples thereof include benzylbenzothiazolium salts such as 3-benzylbenzothiazolium hexafluoroantimonate, 3-benzylbenzothiazolium hexafluorophosphate, 3-benzylbenzothiazolium tetrafluoroborate, 3-(p-methoxybenzyl)benzothiazolium hexafluoroantimonate, 3-benzyl-2-methylthiobenzothiazolium hexafluoroantimonate and 3-benzyl-5-chlorobenzothiazolium hexafluoroantimonate. These benzothiazolium salts may be used alone, or may be used in combination of two or more thereof.

The tertiary amine compound is not particularly limited, and examples thereof include aliphatic tertiary amines such as trimethylamine, triethylamine, tripropylamine, tributylamine, triethylenediamine, 1,4-diazabicyclo[2.2.2]octane, quinuclidine and 3-quinuclidinol; aromatic tertiary amines such as dimethylaniline; and heterocyclic tertiary amines such as isoquinoline, pyridine, collidine and beta-picoline. These tertiary amine compounds may be used alone, or may be used in combination of two or more thereof.

One preferred example of the curing accelerator is one that serves as a thermal acid generator. The thermal acid generator is a substance that serves as a curing accelerator by generating an acid when it is heated. Specific examples of those that can serve as a thermal acid generator among the above-mentioned curing accelerators include sulfonium salts and benzothiazolium salts.

Another preferred example of the curing accelerator is thermally potential one that is activated under a predetermined heating condition (e.g. 80 to 200° C., preferably 100 to 160° C.) to accelerate a crosslinking reaction of a thermosetting resin. Specific examples of thermally potential substances among the above-mentioned curing accelerators include epoxy adducts including an epoxy compound added to an amidine compound, a hydrazine compound, a tertiary amine compound or the like.

Another preferred example of the curing accelerator is hydrolytically potential one that does not serve as a curing agent in a hermetically sealed state, i.e. a moisture shut-off state, but is hydrolyzed to serve as a curing agent under moisture-existing conditions obtained by opening the hermetically sealed state. Specific examples of hydrolytically potential substances among the above-mentioned curing accelerators include epoxy adducts including an epoxy compound added to an amidine compound, a hydrazine compound, a tertiary amine compound or the like.

These curing accelerators may be used alone, or may be used in combination of two or more thereof. Among these curing accelerators, amidine compounds and sulfonium salts are preferred, with amidine compounds being further preferred for setting the piercing strength within the above-mentioned range, and setting the dielectric breakdown voltage to the above-mentioned value.

The content of the curing accelerator in the resin composition to be used for formation of the coating layer 1 is appropriately determined according to, for example, the type of a thermosetting resin and the type of a curing accelerator to be used, and for example, the content of the curing accelerator in terms of the total amount is 0.01 to 6 parts by mass, preferably 0.05 to 5 parts by mass, further preferably 0.1 to 2 parts by mass based on 100 parts by mass of the thermosetting resin for setting the piercing strength within the above-mentioned range, and setting the dielectric breakdown voltage to the above-mentioned value.

(Pigment and/or Dye)

At least one layer that forms the coating layer 1 may contain a pigment and/or dye as necessary. When at least one layer that forms the coating layer 1 contains a pigment and/or dye, discriminability can be imparted to the battery packaging material (the battery packaging material can be colored by a pigment and/or dye), and the heat conductivity of the battery packaging material can be increased to improve the heat dissipation property.

In a conventional film-shaped battery packaging material, it is necessary to blend a pigment and/or dye in either one of an adhesive layer and a base material layer for imparting color tone-dependent discriminability for each battery type, while there have been the disadvantages that the adhesive strength of the adhesive layer is reduced when a pigment and/or dye is blended in the adhesive layer, and the production cost of the base material layer is increased when a pigment and/or dye is blended in the base material layer. On the other hand, in the battery packaging material according to the present invention, discriminability can be imparted to the battery packaging material by including a pigment and/or dye in at least one layer that forms the coating layer, and therefore the disadvantages in impartment of discriminability to a conventional film-shaped battery packaging material can be eliminated. Further, when at least one layer that forms the coating layer contains a pigment and/or dye (particularly an inorganic pigment), the heat conductivity of the battery packaging material can be increased to improve the heat dissipation property, and therefore safety of batteries can be improved.

The material of the pigment is not particularly limited, and the pigment may be either an inorganic pigment or an organic pigment. Specific examples of the inorganic pigment include carbon black, carbon nanotube, graphite, talc, silica, kaolin, montmorilloide, montmorillonite, synthetic mica, hydrotalcite, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, gold, aluminum, copper and nickel. Specific examples of the organic pigment include azo pigments, polycyclic pigments, lake pigments and fluorescent pigments. These pigments may be used alone, or may be used in combination of two or more thereof.

The shape of the pigment is not particularly limited, and examples thereof include a spherical shape, a fibrous shape, a plate shape, an amorphous shape and a balloon shape. The average particle size of the pigment is not particularly limited, and it is, for example, 0.01 to 3 μm, preferably 0.05 to 1 μm. The average particle size of the pigment is a value measured using Shimadzu Laser Diffraction-Type Particle- Size-Distribution Measuring Apparatus SALD-2100-WJA1 by a cyclone injection type dry measurement method in which a powder to be measured is injected from a nozzle by means of compressed air, dispersed in the air, and measured.

The surface of the pigment may be subjected to various kinds of surface treatments such as an insulation treatment and a dispersibility enhancing treatment (resin coating treatment) as necessary.

The type of the dye is not particularly limited as long as it can be dissolved/dispersed in a resin composition to be used for formation of the coating layer 1, and examples thereof include nitro dyes, azo-based dyes, stilbene dyes, carbonium dyes, quinoline dyes, methine dyes, thiazole dyes, quineimine dyes, anthraquinone dyes, indigoid dyes and phthalocyanine dyes. Azo dyes, carbonium dyes, anthraquinone dyes and so on are preferred. These dyes may be used alone, or may be used in combination of two or more thereof.

Among these pigments and dyes, pigments are preferred, inorganic pigments are more preferred, carbon materials such as carbon black, carbon nanotube and graphite are further preferred, and carbon black is especially preferred for further improving the heat dissipation property of the battery packaging material.

When the pigment and/or dye is contained in at least one layer that forms the coating layer 1, the content thereof may be appropriately determined according to, for example, the type of a pigment and/or dye to be used, discriminability and dissipation property to be imparted to the battery packaging material, and for example, the content of the pigment and/or dye in terms of the total amount is 1 to 30 parts by mass based on 100 parts by mass of the thermosetting resin contained in the layer which contains the pigment and/or dye. For imparting further excellent discriminability, the content of the pigment and/or dye in terms of the total amount is 3 to 20 parts by mass based on 100 parts by mass of the thermosetting resin contained in the layer which contains the pigment and/or dye. For imparting further excellent discriminability and suppressing deterioration of moldability which is caused by the pigment and/or dye, the content of the pigment and/or dye in terms of the total amount is 5 to 15 parts by mass based on 100 parts by mass of the thermosetting resin contained in the layer which contains the pigment and/or dye.

(Other Additives)

The resin composition to be used for formation of the coating layer 1 may contain other additives such an organic filler, a slipping agent, a solvent and an elastomer resin as necessary in addition to the above-mentioned components.

Particularly, when the coating layer 1 having a single-layer structure, or a layer situated on the outermost side in the coating layer 1 having a multilayer structure contains a slipping agent, moldability/processability in press molding and embossing can be improved, and operability can be improved.

The type of the organic filler is not particularly limited, and examples thereof include high-melting-point nylon, crosslinked acryl, crosslinked styrene, crosslinked polyethylene and benzoguanamine. The shape of the organic filler is not particularly limited, and examples thereof include a spherical shape, a fibrous shape, a plate shape, an amorphous shape and a balloon shape.

The slipping agent is not particularly limited, and it may be a nonreactive slipping agent, or a reactive slipping agent. Particularly, the reactive slipping agent has the advantage that the slipping agent is hard to be bled and lost from the coating layer 1, so that occurrence of powdering or offset at the time of use, and deterioration of the slipping effect of the coating layer 1 with time can be suppressed, and therefore among slipping agents, a reactive slipping agent is preferred.

Here, the nonreactive slipping agent is a compound that does not have a functional group which reacts with and chemically bonds to the thermosetting resin and which can impart slippage (slipping performance). The reactive slipping agent is a compound that has a functional group which reacts with and chemically bonds to the thermosetting resin and which can impart slippage (slipping performance).

Specific examples of the nonreactive slipping agent include fatty acid amides, metal soaps, hydrophilic silicones, acrylics grafted with silicone, epoxies grafted with silicone, polyethers grafted with silicone, polyesters grafted with silicone, block silicone acrylic copolymers, polyglycerol-modified silicones and paraffins. These nonreactive slipping agents may be used alone, or may be used in combination of two or more thereof.

In the reactive slipping agent, the type of a functional group is appropriately determined according to the type of a thermosetting resin to be used, and examples thereof include a hydroxyl group, a mercapto group, a hydrolyzable silyl group, an isocyanate group, an epoxy group, a polymerizable vinyl group and a (meth)acryloyl group. The number of functional groups per molecule in the reactive slipping agent is not particularly limited, and for example, it is 1 to 3, preferably 1 or 2.

Specific examples of the reactive slipping agent include modified silicones having the above-mentioned functional group; modified fluororesins having the above-mentioned functional group; compounds in which the above-mentioned functional group is introduced into a fatty acid amide such as a stearic acid amide, an oleic acid amide, an erucic acid amide or an ethylene-bis-stearic acid amide; metal soaps including the above-mentioned functional group introduced therein; and paraffins including the above-mentioned functional group introduced therein. These reactive slipping agents may be used alone, or may be used in combination of two or more thereof. Among these reactive slipping agents, modified silicones having the above-mentioned functional group, fluororesins having the above-mentioned functional group, and silicone-modified resins having the above-mentioned functional group are preferred. Specific examples of the modified silicone include modified silicones in which a polymer having the above-mentioned functional group is block-polymerized, such as modified silicones in which an acrylic resin is block-polymerized; and modified silicones in which a monomer having the above-mentioned functional group is graft-polymerized, such as modified silicones in which an acrylate is graft-polymerized. Specific examples of the modified fluororesin include modified fluororesins in which a monomer having the above-mentioned functional group is graft-polymerized, such as fluororesins in which an acrylate is graft-polymerized; and fluororesins in which a polymer having the above-mentioned functional group is block-polymerized, such as modified fluororesins in which an acrylic resin is block-polymerized. Specific examples of the silicone-modified resin include silicone-modified resins which have the above-mentioned functional group and in which silicone is graft-polymerized, such as silicone-modified acrylic resins in which silicone is graft-polymerized with an acrylic resin having the above-mentioned functional group. Specific examples of the modified fluororesin include modified fluororesins in which a monomer having the above-mentioned functional group is graft-polymerized, such as fluororesins in which an acrylate is graft-polymerized; and fluororesins in which a polymer having the above-mentioned functional group is block-polymerized, such as modified fluororesins in which an acrylic resin is block-polymerized. Examples of the especially preferred reactive slipping agent among those described above include modified silicones in which a monomer or polymer having the above-mentioned functional group is polymerized with one end of silicone; and modified fluororesins in which a monomer or polymer having the above-mentioned functional group is polymerized with one end of a fluororesin. As these modified silicones and modified fluororesins, for example, "MODIPER (registered trademark) F and FS Series" (manufactured by NOF CORPORATION), "SYMAC (registered trademark) Series" (TOAGOSEI CO., LTD.), and so on are commercially available, and these commercial products can also be used.

These slipping agents may be used alone, or may be used in combination of two or more thereof.

When the coating layer 1 having a single-layer structure, or a layer situated on the outermost side in the coating layer 1 having a multilayer structure contains a slipping agent, the content of the slipping agent is not particularly limited, and for example, the content of the slipping agent in terms of the total amount is 1 to 12 parts by mass, preferably 3 to 10 parts by mass, further preferably 5 to 8 parts by mass based on 100 parts by mass of the thermosetting resin.

When a layer other than the layer situated on the outermost surface (i.e. a layer provided between the outermost surface layer that forms the coating layer 1 and the barrier 2) in the coating layer 1 having a multilayer structure contains an elastomer resin, moderate flexibility is imparted to the coating layer 1 while shrinkage of the coating layer 1 during curing is suppressed, so that the moldability can be further improved.

The elastomer resin may be one that has a functional group crosslinkable with the thermosetting resin, and is crosslinked with the thermosetting resin when cured, or may be one that does not have such a functional group, and is not crosslinked with the thermosetting resin even when cured. The type of an elastomer resin is not particularly limited, and examples thereof include polyolefin-based elastomers such as ethylene-based elastomers containing, as constituent monomers, ethylene and one or more α-olefins having 2 to 20 carbon atoms (excluding ethylene); styrene-based elastomers; polyester-based elastomers; urethane-based elastomers; acrylic elastomers; epoxy-based elastomers such as bisphenol A-type epoxy-based elastomers;

polyol-based elastomers such as those of polyester polyols, polyester polyurethane polyols, polyether polyols and polyether polyurethane polyols; and rubber components such as nitrile rubber, fluororubber, acrylic rubber, silicone rubber, chloroprene rubber, isoprene rubber and butadiene rubber. Among these elastomer resins, urethane-based elastomers, epoxy-based elastomers and polyol-based elastomers are preferred.

These elastomer resins may be used alone, or may be used in combination of two or more thereof.

When a layer other than the layer situated on the outermost surface (i.e. a layer provided between the outermost surface layer that forms the coating layer 1 and the barrier 2) in the coating layer 1 having a multilayer structure contains an elastomer resin, the content of the elastomer resin is not particularly limited, and for example, the content of the slipping agent in terms of the total amount is 3 to 50 parts by mass, preferably 5 to 30 parts by mass, further preferably 10 to 20 parts by mass based on 100 parts by mass of the thermosetting resin.

(Suitable Layer Structure of Coating Layer 1)

As described above, the coating layer 1 may have a single-layer structure, or a multilayer structure having two or more layers, but for allowing the coating layer 1 to have such a large thickness that the piercing strength can be set within the above-mentioned range, and the dielectric breakdown voltage can be set to the above-mentioned value, the coating layer 1 has preferably a multilayer structure having two or more layers, further preferably a multilayer structure having two or three layers, especially preferably a multilayer structure having three layers.

When the coating layer 1 has a multilayer structure having two layers, i.e. when the coating layer 1 having a two-layer structure contains a pigment and/or dye, the pigment and/or dye may be contained in at least either one of the first coating layer 1a and the second coating layer 1b. For reducing a difference in color tone between a molded part and a non-molded part after molding the battery packaging material, it is preferred that the pigment and/or dye is contained in both the first coating layer 1a and the second coating layer 1b.

When the coating layer 1 has a multilayer structure having three layers, i.e. when the coating layer 1 having a three-layer structure contains a pigment, the pigment and/or dye may be contained in at least any one of the first coating layer 1a, the second coating layer 1b and the third coating layer 1c. For reducing a difference in color tone between a molded part and a non-molded part after molding the battery packaging material, it is preferred that the pigment and/or dye is contained in at least two of the first coating layer 1a, the second coating layer 1b and the third coating layer 1c, and it is further preferred that the pigment and/or dye is contained in all these three layers.

(Thickness of Coating Layer 1)

The total thickness of the coating layer 1 is not particularly limited, but it is, for example, about 4 to 20 μm, preferably about 6 to 18 μm for allowing the coating layer to have such a large thickness that the piercing strength can be set within the above-mentioned range, and the above-mentioned dielectric breakdown voltage can be imparted. More specifically, when the coating layer 1 has a single-layer structure, the thickness thereof is, for example, about 2 to 10 μm, preferably about 3 to 7 μm. When the coating layer 1 has a multilayer structure having two or more layers, the thickness of each layer alone is, for example, about 1 to 5 μm, preferably about 2 to 4 μm.

[Barrier Layer 2]

In the battery packaging material according to the present invention, the barrier layer 2 is a layer which improves the strength of the packaging material, and also functions as a barrier layer for preventing ingress of water vapor, oxygen, light and the like into the battery. Specific examples of the material of the barrier layer 2 include metal foil of, for example, aluminum, stainless steel and titanium; and films on which an inorganic compound such as silicon oxide or alumina is vapor-deposited. Among them, metal foil is preferred, and aluminum foil is further preferred. For preventing occurrence of creases and pinholes during production of the battery packaging material, it is preferred to use soft aluminum foil, for example, annealed aluminum foil (JIS A8021P-O) or (JIS A8079P-O), for the barrier layer 2 in the present invention.

The thickness of the barrier layer 2 is not particularly limited, but for example, it is normally 10 to 200 μm, preferably 20 to 100 μm when metal foil is used.

When metal foil is to be used as the barrier layer 2, it is preferred that at least one surface, preferably at least a surface on the sealant layer side, further preferably both surfaces are subjected to a chemical conversion treatment for stabilization of bonding, prevention of dissolution and corrosion, and so on. Here, the chemical conversion treatment is a treatment for forming an acid resistant film on the surface of the barrier layer 2. Examples of the chemical conversion treatment include a chromic acid chromate treatment using a chromic acid compound such as chromium nitrate, chromium fluoride, chromium sulfate, chromium acetate, chromium oxalate, chromium biphosphate, acetylacetate chromate, chromium chloride or chromium potassium sulfate; a phosphoric acid chromate treatment using a phosphoric acid compound such as sodium phosphate, potassium phosphate, ammonium phosphate or polyphosphoric acid; and a chromate treatment using an aminated phenol polymer formed of repeating units represented by the following general formulae (1) to (4). In the aminated phenol polymer, the repeating units represented by the following general formulae (1) to (4) may be contained alone, or may be contained in any combination of two or more thereof.

[Chemical Formula 1]

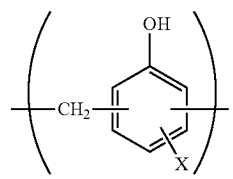

(1)

[Chemical Formula 2]

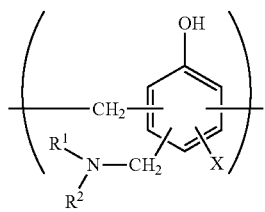

(2)

[Chemical Formula 3]

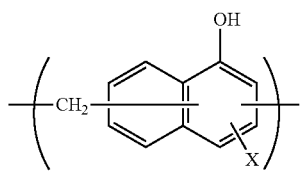

(3)

[Chemical Formula 4]

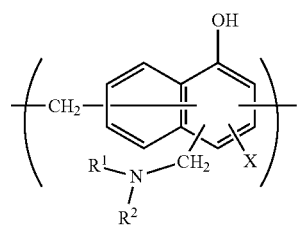

(4)

In the general formulae (1) to (4), X represents a hydrogen atom, a hydroxyl group, an alkyl group, a hydroxyalkyl group, an allyl group or a benzyl group. $R^1$ and $R^2$ are the same or different, and each represent a hydroxyl group, an alkyl group or a hydroxyalkyl group. In the general formulae (1) to (4), examples of the alkyl group represented by X, $R^1$ and $R^2$ include linear or branched alkyl groups with 1 to 4 carbon atoms, such as a methyl group, an ethyl group, a n-propyl group, an isopropyl group, a n-butyl group, an isobutyl group and a tert-butyl group. Examples of the hydroxyalkyl group represented by X, $R^1$ and $R^2$ include linear or branched alkyl groups having 1 to 4 carbon atoms, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group and a 4-hydroxybutyl group. In the general formulae (1) to (4), X is preferably any one of a hydrogen atom, a hydroxyl group, and a hydroxyalkyl group. The number average molecular weight of the aminated phenol polymer formed of repeating units represented by the general formulae (1) to (4) is, for example, about 500 to about 1000000, preferably about 1000 to about 20000.

Examples of the chemical conversion treatment method for imparting corrosion resistance to the metal foil include a method in which the metal foil is coated with a dispersion of fine particles of a metal oxide such as aluminum oxide, titanium oxide, cerium oxide or tin oxide or barium sulfate in phosphoric acid, and annealed at 150° C. or higher to form a corrosion resistance treatment layer on the surface of the metal foil. A resin layer with a cationic polymer crosslinked with a crosslinking agent may be formed on the corrosion resistance treatment layer. Here, examples of the cationic polymer include polyethyleneimine, ion polymer complexes composed of a polymer having polyethyleneimine and a carboxylic acid, primary amine-grafted acrylic resins obtained by grafting primary amine to an acryl backbone, polyallylamine or derivatives thereof, and aminophenol. These cationic polymers may be used alone, or may be used in combination of two or more thereof. Examples of the crosslinking agent include compounds having at least one functional group selected from the group consisting of an isocyanate group, a glycidyl group, a carboxyl group and an oxazoline group, and silane coupling agents. These crosslinking agents may be used alone, or may be used in combination of two or more thereof.

The chemical conversion treatment may be performed with one chemical conversion treatment alone, or may be performed in combination of two or more chemical conversion treatments. The chemical conversion treatments may be performed using one compound alone, or may be performed using two or more compounds in combination. Among them, a chromic acid chromate treatment is preferred, and a chromate treatment using a chromic acid compound, a phosphoric acid compound and the aminated phenol polymer in combination is further preferred.

The amount of the acid resistant film to be formed on the surface of the metal foil in the chemical conversion treatment is not particularly limited, but for example, when a chromate treatment is performed using a chromic acid compound, a phosphoric acid compound and the aminated phenol polymer in combination, it is desirable that the chromic acid compound be contained in an amount of about 0.5 mg to about 50 mg, preferably about 1.0 mg to about 40 mg, in terms of chromium, the phosphorus compound be contained in an amount of about 0.5 mg to about 50 mg, preferably about 1.0 mg to about 40 mg, in terms of phosphorus, and the aminated phenol polymer be contained in an amount of about 1 mg to about 200 mg, preferably about 5.0 mg to 150 mg, per 1 m² of the surface of the metal foil.

The chemical conversion treatment is performed in the following manner: a solution containing a compound to be used for formation of an acid resistant film is applied to the surface of the metal foil by a bar coating method, a roll coating method, a gravure coating method, an immersion method or the like, and heating is then performed so that the temperature of the metal foil reaches about 70 to 200° C. The metal foil may be subjected to a degreasing treatment by an alkali immersion method, an electrolytic cleaning method, an acid cleaning method, an electrolytic acid cleaning method or the like before the barrier layer 2 is subjected to a chemical conversion treatment. When a degreasing treatment is performed as described above, the chemical conversion treatment of the surface of the metal foil can be further efficiently performed.

[Adhesive Layer 4]

In the battery packaging material according to the present invention, the adhesive layer 4 is a layer that is provided between the barrier layer 2 and the sealant layer 3 as necessary for strongly bonding the barrier layer 2 and the sealant layer 3 to each other.

The adhesive layer 4 is formed from a bonding resin composition capable of bonding the barrier layer 2 and the sealant layer 3 to each other. The adhesive agent component to be used for formation of the adhesive layer 4 is not particularly limited as long as it is capable of bonding the barrier layer 2 and the sealant layer 3 to each other, and it may be a two-liquid curable adhesive agent, or may be a one-liquid curable adhesive agent. Further, the bonding mechanism of the adhesive agent component to be used for formation of the adhesive layer 4 is not particularly limited, and may be any one of a chemical reaction type, a solvent volatilization type, a heat melting type and a heat pressing type. Examples thereof include polyester-based resins such as polyethylene terephthalate, polybutylene terephthalate, polyethylene naphthalate, polybutylene naphthalate, polyethylene isophthalate, polycarbonate and copolyesters; polyether-based adhesive agents; polyurethane-based adhesive agents; epoxy-based resins; phenol resin-based resins; polyamide-based resins such as nylon 6, nylon 66, nylon 12 and copolymerized polyamides; polyolefin-based resins such as polyolefins, carboxylic acid-modified polyolefins and metal-modified polyolefins, and polyvinyl acetate-based resins; cellulose-based adhesive agents; (meth)acrylic resins; polyimide-based resins; amino resins such as urea resins and melamine resins; rubbers such as chloroprene rubber, nitrile rubber and styrene-butadiene rubber; and silicone-based resins.

In formation of the adhesive layer 4, resin compositions for adhesive layers, which contain a thermosetting resin and a curing accelerator, are preferably used for reducing the lead time by quickly curing the adhesive layer 4 without requiring aging under a high-temperature condition during production, setting the piercing strength within the above-mentioned range, and setting the dielectric breakdown voltage to the above-mentioned value. When a thermosetting resin and a curing accelerator are used in combination, the adhesive layer 4 is quickly cured without requiring aging under a high-temperature condition, so that the lead time can be reduced, and moldability and an insulation quality can be improved.

The type of the thermosetting resin to be used in the resin composition for adhesive layers, the preferred thermosetting resin, and so on are the same as in the case of the thermosetting resin described above in the section of [Coating Layer 1]. The type of the curing accelerator to be used in the resin composition for adhesive layers, the preferred curing accelerator, and so on are the same as in the case of the curing accelerator described above in the section of [Coating Layer 1]. The content of the curing accelerator in the resin composition for adhesive layers is appropriately determined according to, for example, the type of a thermosetting resin and the type of a curing accelerator to be used, and for example, the content of the curing accelerator in terms of the total amount is 0.01 to 6 parts by mass, preferably 0.05 to 5 parts by mass, further preferably 0.1 to 2 parts by mass based on 100 parts by mass of the thermosetting resin.

The thickness of the adhesive layer 4 is, for example, 2 to 50 μm, preferably 3 to 25 μm.

[Sealant Layer 3]

In the battery packaging material according to the present invention, the sealant layer 3 corresponds to the innermost layer, and at the time of assembling a battery, the sealant layers are heat-welded to each other to hermetically seal the battery element therein.

The resin component to be used in the sealant layer 3 is not particularly limited as long as it can be heat-welded, and examples thereof include polyolefins, cyclic polyolefins, carboxylic acid-modified polyolefins and carboxylic acid-modified cyclic polyolefins.

Specific examples of the polyolefin include polyethylene such as low-density polyethylene, medium-density polyethylene, high-density polyethylene and linear low-density polyethylene; crystalline or noncrystalline polypropylene such as homopolypropylene, block copolymers of polypropylene (e.g. block copolymers of propylene and ethylene) and random copolymers of polypropylene (e.g. random copolymers of propylene and ethylene); and terpolymers of ethylene-butene-propylene. Among these polyolefins, polyethylene and polypropylene are preferred.

The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene. Examples of the cyclic monomer as a constituent monomer of the cyclic polyolefin include cyclic alkenes such as norbornene, specifically cyclic dienes such as cyclopentadiene, dicyclopentadiene, cyclohexadiene and norbornadiene. Among these polyolefins, cyclic alkenes are preferred, and norbornene is further preferred.

The carboxylic acid-modified polyolefin is a polymer obtained by modifying the polyolefin with a carboxylic acid. Examples of the carboxylic acid to be used for modification include maleic acid, acrylic acid, itaconic acid, crotonic acid, maleic anhydride and itaconic anhydride.

The carboxylic acid-modified cyclic polyolefin is a polymer obtained by performing copolymerization with an α,β-unsaturated carboxylic acid or an anhydride thereof replacing a part of monomers that form the cyclic polyolefin, or by block-polymerizing or graft-polymerizing an α,β-unsaturated carboxylic acid or an anhydride thereof with the cyclic polyolefin. The cyclic polyolefin to be modified with a carboxylic acid is the same as described above. The carboxylic acid to be used for modification is the same as that used for modification of the acid-modified cycloolefin copolymer.

Among these resin components, crystalline or noncrystalline polyolefins, cyclic polyolefins, and blend polymers thereof are preferred, and polyethylene, polypropylene, copolymers of ethylene and norbornene, and blend polymers of two or more thereof are further preferred.

The sealant layer 3 may be formed from one resin component alone, or may be formed from a blend polymer obtained by combining two or more resin components. Further, the sealant layer may be formed of only one layer, or may be formed of two or more layers with the same resin component or different resin components.

The thickness of the sealant layer 3 is not particularly limited, but it is 2 to 2000 μm, preferably 5 to 1000 μm, further preferably 10 to 500 μm.

[Thickness of Battery Packaging Material]

The battery packaging material according to the present invention does not have on the barrier layer 2 a base material layer including an adhesive layer and a resin film, and therefore can be made thinner as compared to a conventional film-shaped battery packaging material. The total thickness of the battery packaging material according to the present invention is, for example, about 40 to 120 μm, preferably about 50 to 100 μm for allowing the battery packaging material to have such a large thickness that the piercing strength can be set within the above-mentioned range, and the above-mentioned dielectric breakdown voltage can be set to the above-mentioned value.

3. Method for Producing Battery Packaging Material

While the method for producing a battery packaging material according to the present invention is not particularly limited as long as a laminate including layers each having predetermined composition is obtained, examples thereof include a method including:

a coating layer forming step of applying a resin composition, which contains a thermosetting resin and a curing accelerator, onto a barrier layer, and heating and curing the resin composition; and a step of laminating a sealant layer 3 on a surface of the barrier layer on a side opposite to a surface on which the coating layer is laminated, before or after the coating layer forming step.

The coating layer forming step may be carried out once when the coating layer 1 is a single layer, and the coating layer forming step may be carried out a plurality of times when the coating layer 1 includes multiple layers.

The resin composition for forming the coating layer can be applied to the barrier layer 2 in the coating layer forming step by a coating method such as a gravure coating method or a roll coating method. For heating conditions for curing the resin composition applied onto the barrier layer 2, for example, the temperature is 90 to 200° C., preferably 100 to 190° C., and the time is 0.1 to 60 seconds, preferably 1 to 30 seconds.

Thus, in the present invention, the slipping coating layer 1 can be sufficiently cured only with the above-mentioned heating conditions without requiring aging under a high-temperature condition in the coating layer forming step, and therefore the lead time can be considerably reduced.

When the sealant layer 3 is to be laminated directly on the barrier layer 2, a resin component that forms the sealant layer 3 may be applied onto the barrier layer 2 by a method such as a gravure coating method or a roll coating method. Examples of the method for providing the adhesive layer 4 between the barrier layer 2 and the sealant layer 3 include (1) a method in which the adhesive layer 4 and the sealant layer 3 are co-extruded to be laminated on the barrier layer 2 (coextrusion lamination method); (2) a method in which a laminate including the adhesive layer 4 and the sealant layer 3 is formed separately, and the laminate is laminated on the barrier layer 2 by a heat lamination method; (3) a method in which the adhesive layer 4 is laminated on the barrier layer 2 by, for example, an extrusion method or a method of applying an adhesive agent for formation of the adhesive layer 4 onto the barrier layer 2 by solution coating and drying at a high temperature and further baking the adhesive agent, and the sealant layer 3 formed in a sheet-shaped film beforehand is laminated on the adhesive layer 4 by a thermal lamination method; and (4) a method in which a laminate A and the sealant layer 3 are bonded to each other with the adhesive layer 4 interposed therebetween while the melted adhesive layer 4 is poured between the barrier layer 2 and the sealant layer 3 formed in a sheet-shape film beforehand (sandwich lamination method).

A laminate including the coating layer 1 having a single-layer or multilayer structure, the barrier layer 2, the surface of which is subjected to a chemical conversion treatment as necessary, the adhesive layer 4 provided as necessary, and the sealant layer 3 is formed in the manner described above.

In the battery packaging material according to the present invention, the layers that form the laminate may be subjected to a surface activation treatment such as a corona treatment, a blast treatment, an oxidation treatment or an ozone treatment as necessary for improving or stabilizing film formability, lamination processing and final product secondary processing (pouching and embossing molding) suitability, and the like.

4. Use of Battery Packaging Material

The battery packaging material according to the present invention is molded into a desired shape and used as a packaging material for hermetically sealing therein and storing battery elements such as a positive electrode, a negative electrode and an electrolyte.

Specifically, a battery element including at least a positive electrode, a negative electrode and an electrolyte is covered with the battery packaging material according to the present invention such that a flange portion (region where the sealant layer 3 is in contact with itself) can be formed on the periphery of the battery element while a metal terminal connected to each of the positive electrode and the negative electrode protrudes to the outside, and the sealant layer 3 at the flange portion is heat-sealed with itself, thereby providing a battery hermetically sealed with a battery packaging material. When the battery element is stored in the battery packaging material according to the present invention, the battery packaging material according to the present invention is used such that the sealant portion is on the inner side (surface in contact with the battery element).

As described above, in the battery packaging material according to the present invention, the laminate has a piercing strength of 5 N or more as measured in accordance with JIS 1707:1997, and the coating layer has a dielectric breakdown voltage of 1.0 kV or more as measured in accordance with JIS C2110-1. Thus, the battery packaging material has excellent moldability and insulation quality. Accordingly, generation of pinholes in molding, etc. is effectively suppressed, and therefore the battery packaging material can be suitably used as a packaging material for storing a battery element. Since the dielectric breakdown voltage of the coating layer is 1.0 kV or more, an insulation quality as a battery packaging material is effectively improved, and thus the battery packaging material can be suitably used as a packaging material to be used in batteries that are modularized.

The battery packaging material according to the present invention may be used for either a primary battery or a secondary battery, but is preferably used for a secondary battery. The type of a secondary battery to which the battery packaging material according to the present invention is applied is not particularly limited, and examples thereof include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Among these secondary batteries, preferred subjects to which the battery packaging material according to the present invention is applied include lithium ion batteries and lithium ion polymer batteries.

Example

The present invention will be described in detail below by showing examples and comparative examples. It is to be noted, however, that the present invention is not limited to the examples.
[Production of Battery Packaging Material]
A coating layer was formed, in a thickness as shown in Tables 1 and 2, on a barrier layer formed of aluminum foil (thickness: 40 μm) subjected to a chemical conversion treatment on both surfaces. Specifically, a thermosetting resin composition as shown in Tables 1 and 2 was applied to the barrier layer, and cured to laminate a coating layer on the barrier layer. In production of the battery packaging material, the coating layer was cured in an extremely short time of 30 seconds at 160° C., so that the lead time was considerably reduced. Details of the resin composition that forms the coating layer are as follows. The chemical conversion treatment of the aluminum foil used as the barrier layer was performed by applying to both the surfaces of the aluminum foil a treatment liquid including a phenol resin, a chromium fluoride compound and phosphoric acid using a roll coating method in such a manner that the application amount of chromium was 10 mg/m$^2$ (dry weight), and performing baking for 20 seconds under such conditions that the film temperature was 180° C. or higher. Next, a sealant layer including two layers was laminated on the barrier layer by co-extruding carboxylic acid-modified polypropylene (disposed on the barrier layer side; thickness: 23 μm) and homopolypropylene (innermost layer; thickness: 23 μm) onto a surface of the barrier layer on which the coating layer was not laminated. Thus, a battery packaging material including a laminate with a coating layer, a barrier layer and a sealant layer laminated in this order was obtained.
(Resin Compositions Shown in Tables 1 and 2 for Forming Coating Layer)
<Urethane Resin>
Thermosetting resin: 100 parts by mass
(main agent: urethane polyol having a hydroxyl value of less than 40, curing agent: diphenylmethane diisocyanate adduct)
Curing accelerator: 1 part by mass
(imidazole compound that accelerates the crosslinking reaction of the thermosetting resin at 80 to 150° C.)
<Epoxy Resin>
Thermosetting resin: 100 parts by mass
(main agent: phenol novolac-type epoxy resin, curing agent: methylhexahydrophthalic acid anhydride)
Curing accelerator: 1 part by mass
(1,8-diazabicyclo[5.4.0]undec-7-ene)
<Thermosetting Acrylic Resin>
Thermosetting resin: 100 parts by mass
(main agent: methacrylic acid ester copolymer, curing agent: diphenylmethane diisocyanate adduct)
Curing accelerator: 1 part by mass
(1,5-diazabicyclo[4.3.0]non-5-ene)

<Polyimide Resin>
Thermosetting resin: 100 parts by mass
(main agent: polyimide resin having 3,3'-diaminobenzophenone and 3,4'-diaminobenzophenone as monomers, curing agent: methylhexahydrophthalic acid anhydride)
Curing accelerator: 1 part by mass
(imidazole compound that accelerates the crosslinking reaction of the thermosetting resin at 80 to 150° C.)
[Measurement of Piercing Strength]
The piercing strength was measured by a method conforming to JIS 1707:1997 for each of the battery packaging materials obtained as described above. The piercing strength was measured with a needle stuck from the coating layer side. The results are shown in Tables 1 and 2.
[Measurement of Dielectric Breakdown Voltage]
The dielectric breakdown voltage (alternating current, 50 Hz) of the coating layer was measured in accordance with JIS C2110-1 for each of the battery packaging materials obtained as described above. Details of measurement conditions are as follows. The results are shown in Tables 1 and 2.
(Test Conditions)
Pressure boosting method: short-time method
Ambient medium: air (23° C.)
Pressure boosting rate: 0.3 kV/s
Test electrode: φ25 circular column/φ5 circular column
Number of measurements: n=3
Test environment: 23° C.±2° C., 50±5% RH
[Evaluation of Moldability]
Each battery packaging material obtained as described above was cut to prepare a strip piece of 120×80 mm, and the strip piece was used as a test sample. A straight mold including a rectangular male mold of 30×50 mm, and a female mold with a clearance of 0.5 mm from the male mold was provided, the test sample was placed on the female mold in such a manner that the heat-adhesive resin layer was situated on the male mold side, the test sample was pressed at a pressing pressure (surface pressure) of 0.1 MPa with the molding depth set to 3.5 to 5.5 mm, and cold molding (draw-in one-step molding) was performed. Presence/absence of pinholes and cracks in the metal layer in each of the molded test samples was checked, and the ratio of occurrence (%) of pinholes and cracks was calculated. For the ratio of occurrence of pinholes and cracks, a test sample having even one pinhole or crack after being molded as described above was discriminated as a molding defective product, and the ratio of molding defective products occurring at the time of molding 100 test samples under the above-mentioned conditions was determined. The test was passed when the ratio of molding defective products was less than 5%, and the test was not passed when the ratio of molding defective products was 5% or more. Moldability was evaluated by classifying the obtained results in accordance with the following criteria. The results are shown in Tables 1 and 2. In the following criteria, ranks A to D indicate that there is no problem in quality from a practical standpoint.
(Evaluation Criteria of Moldability)
A: passed at a molding depth of 5.5 mm.
B: not passed at a molding depth of 5.5 mm, and passed at a molding depth of 5.0 mm.
C: not passed at a molding depth of 5.0 mm, and passed at a molding depth of 4.5 mm.
D: not passed at a molding depth of 4.5 mm, and passed at a molding depth of 4.0 mm.
E: not passed at a molding depth of 4.0 mm, and passed at a molding depth of 3.5 mm.
F: not passed at a molding depth of 3.5 mm.

TABLE 1

| | Resin composition for forming coating layer | Thickness of coating layer (μm) | Piercing strength (N) | Dielectric breakdown voltage (kV) | Evaluation of moldability |
|---|---|---|---|---|---|
| Example 1 | Urethane resin | 3 | 5 | 1 | D |
| Example 2 | Urethane resin | 3 | 9 | 1 | D |
| Example 3 | Urethane resin | 3 | 13 | 1 | C |
| Example 4 | Urethane resin | 5 | 5 | 1.3 | D |
| Example 5 | Urethane resin | 5 | 9 | 1.3 | D |
| Example 6 | Urethane resin | 5 | 13 | 1.3 | B |
| Example 7 | Urethane resin | 7 | 5 | 1.5 | D |
| Example 8 | Urethane resin | 7 | 9 | 1.5 | C |
| Example 9 | Urethane resin | 7 | 13 | 1.5 | A |
| Example 10 | Epoxy resin | 3 | 5 | 1 | D |
| Example 11 | Epoxy resin | 3 | 9 | 1 | D |
| Example 12 | Epoxy resin | 3 | 13 | 1 | C |
| Example 13 | Epoxy resin | 5 | 5 | 1.3 | D |
| Example 14 | Epoxy resin | 5 | 9 | 1.3 | D |
| Example 15 | Epoxy resin | 5 | 13 | 1.3 | B |
| Example 16 | Epoxy resin | 7 | 5 | 1.5 | D |
| Example 17 | Epoxy resin | 7 | 9 | 1.5 | C |
| Example 18 | Epoxy resin | 7 | 13 | 1.5 | A |
| Example 19 | Thermosetting acrylic resin | 3 | 5 | 1 | D |
| Example 20 | Thermosetting acrylic resin | 3 | 9 | 1 | D |
| Example 21 | Thermosetting acrylic resin | 3 | 13 | 1 | C |
| Example 22 | Thermosetting acrylic resin | 5 | 5 | 1.3 | D |
| Example 23 | Thermosetting acrylic resin | 5 | 9 | 1.3 | D |
| Example 24 | Thermosetting acrylic resin | 5 | 13 | 1.3 | B |
| Example 25 | Thermosetting acrylic resin | 7 | 5 | 1.5 | D |
| Example 26 | Thermosetting acrylic resin | 7 | 9 | 1.5 | C |
| Example 27 | Thermosetting acrylic resin | 7 | 13 | 1.5 | A |
| Example 28 | Polyimide resin | 3 | 5 | 1 | D |
| Example 29 | Polyimide resin | 3 | 9 | 1 | D |
| Example 30 | Polyimide resin | 3 | 13 | 1 | C |
| Example 31 | Polyimide resin | 5 | 5 | 1.3 | D |
| Example 32 | Polyimide resin | 5 | 9 | 1.3 | D |
| Example 33 | Polyimide resin | 5 | 13 | 1.3 | B |
| Example 34 | Polyimide resin | 7 | 5 | 1.5 | D |
| Example 35 | Polyimide resin | 7 | 9 | 1.5 | C |
| Example 36 | Polyimide resin | 7 | 13 | 1.5 | A |

TABLE 2

| | Resin composition for forming coating layer | Thickness of coating layer (μm) | Piercing strength (N) | Dielectric breakdown voltage (kV) | Evaluation of moldability |
|---|---|---|---|---|---|
| Comparative Example 1 | Urethane resin | 1 | 2 | 0.6 | F |
| Comparative Example 2 | Urethane resin | 1 | 4 | 0.6 | F |
| Comparative Example 3 | Urethane resin | 1 | 5 | 0.6 | F |
| Comparative Example 4 | Urethane resin | 1.5 | 2 | 1 | F |
| Comparative Example 5 | Urethane resin | 1.5 | 4 | 1 | F |
| Comparative Example 6 | Epoxy resin | 1 | 2 | 0.6 | F |
| Comparative Example 7 | Epoxy resin | 1 | 4 | 0.6 | F |
| Comparative Example 8 | Epoxy resin | 1 | 2 | 1 | F |
| Comparative Example 9 | Epoxy resin | 1.5 | 4 | 1 | F |
| Comparative Example 10 | Epoxy resin | 1.5 | 2 | 1.3 | F |
| Comparative Example 11 | Thermosetting acrylic resin | 1 | 2 | 0.6 | F |
| Comparative Example 12 | Thermosetting acrylic resin | 1 | 4 | 0.6 | F |
| Comparative Example 13 | Thermosetting acrylic resin | 1 | 2 | 1 | F |
| Comparative Example 14 | Thermosetting acrylic resin | 1.5 | 4 | 1 | F |
| Comparative Example 15 | Thermosetting acrylic resin | 1.5 | 2 | 1.3 | F |
| Comparative Example 16 | Polyimide resin | 1 | 2 | 0.6 | F |
| Comparative Example 17 | Polyimide resin | 1 | 4 | 0.6 | F |
| Comparative Example 18 | Polyimide resin | 1 | 2 | 1 | F |
| Comparative Example 19 | Polyimide resin | 1.5 | 4 | 1 | F |
| Comparative Example 20 | Polyimide resin | 1.5 | 2 | 1.3 | F |

[Evaluation Results]

The results shown in Tables 1 and 2 show that the battery packaging materials of Examples 1 to 36 in which the laminate had a piercing strength of 5 N or more as measured in accordance with JIS 1707:1997, and the coating layer had a dielectric breakdown voltage of 1.0 kV or more as measured in accordance with JIS C2110-1 had excellent moldability. On the other hand, the battery packaging materials of Comparative Examples 1 to 20 in which the piercing strength was less than 5 N or the dielectric breakdown voltage was 1.0 kV had poor moldability.

DESCRIPTION OF REFERENCE SIGNS

1: Coating layer
1a: First coating layer
1b: Second coating layer
1c: Third coating layer
2: Barrier layer
3: Sealant layer

The invention claimed is:
1. A battery packaging material which is a laminate comprising at least a coating layer as an outermost layer, a barrier layer and a sealant layer in this order, wherein:
the sealant layer comprises at least one resin selected from the group consisting of polyolefins, cyclic polyolefins, carboxylic acid-modified polyolefins, and carboxylic acid-modified cyclic polyolefins,
the coating layer is configured to have a single layer or multiple layers formed of a cured product of a resin composition consisting of a thermosetting resin, a curing accelerator, and optionally one or more of: a pigment, a dye, an organic filler, a slipping agent, a solvent, and an elastomer resin,
the thermosetting resin is at least one selected from the group consisting of an epoxy resin, an amino resin, an acrylic resin, a phenol resin, an unsaturated polyester resin, a polyimide resin, and an alkyd resin, the curing accelerator is at least one selected from the group consisting of an amidine compound, a ketimine compound, a hydrazine compound, a sulfonium salt, a benzothiazolium salt, and a tertiary amine compound, the laminate has a piercing strength of 5 N or more as measured in accordance with JIS 1707:1997, and the coating layer has a dielectric breakdown voltage of 1.0 kV or more as measured in accordance with JIS C2110-1.

2. The battery packaging material according to claim 1, wherein the coating layer has a three-layer structure in which a first coating layer, a second coating layer and a third coating layer are laminated in this order from the outermost surface side to the barrier layer side.

3. The battery packaging material according to claim 1, wherein the resin composition used for formation of at least one layer in the coating layer consists of the thermosetting resin, the curing accelerator, and at least one of the pigment and the dye.

4. The battery packaging material according to claim 3, wherein the pigment is an inorganic pigment.

5. The battery packaging material according to claim 1, wherein the barrier layer is metal foil.

6. The battery packaging material according to claim 1, wherein the battery packaging material has a thickness of 40 to 120 μm as a whole.

7. The battery packaging material according to claim 1, wherein the coating layer has a thickness in a range of from 2 to 10 μm.

8. The battery packaging material according to claim 1, wherein the coating layer has a thickness in a range of from 3 to 7 μm.

9. A method for producing the battery packaging material according to claim 1, the method comprising:
a coating layer forming step of applying the resin composition onto a barrier layer and heating and curing the resin composition; and
a step of laminating the sealant layer on a surface of the barrier layer on a side opposite to a surface on which the coating layer is laminated, before or after the coating layer forming step.

10. A battery comprising a battery element including at least a positive electrode, a negative electrode and an electrolyte, the battery element being stored in the battery packaging material according to claim 1.

11. A method of sealing a battery element with a battery packaging material, the method comprising:
sealing the battery element by providing the battery packaging material according to claim 1 around the periphery of the battery element and heat-welding the sealant layer with itself,
wherein the battery element includes positive and negative electrodes, an electrolyte, and metal terminals connected to the positive and negative electrodes that protrude from the battery element to outside of the battery packaging material.

12. A method for producing a battery, the method comprising:
a step of storing in a battery packaging material a battery element including at least a positive electrode, a negative electrode and an electrolyte,
wherein:
the battery packaging material is a laminate including at least a coating layer as an outermost layer, a barrier layer and a sealant layer in this order,
the sealant layer comprises at least one resin selected from the group consisting of polyolefins, cyclic polyolefins, carboxylic acid-modified polyolefins, and carboxylic acid-modified cyclic polyolefins,
the coating layer is configured to have a single layer or multiple layers formed of a cured product of a resin composition consisting of a thermosetting resin, a curing accelerator, and optionally one or more of: a pigment, an organic filler, a slipping agent, a solvent, and an elastomer,
the thermosetting resin is at least one selected from the group consisting of an epoxy resin, an amino resin, an acrylic resin, a phenol resin, an unsaturated polyester resin, a polyimide resin, and an alkyd resin,
the curing accelerator is at least one selected from the group consisting of an amidine compound, a ketimine compound, a hydrazine compound, a sulfonium salt, a benzothiazolium salt, and a tertiary amine compound,
the laminate has a piercing strength of 5 N or more as measured in accordance with JIS 1707:1997, and
the coating layer has a dielectric breakdown voltage of 1.0 kV or more as measured in accordance with JIS C2110-1.

13. A battery packaging material which is a laminate comprising at least a coating layer as an outermost layer, a barrier layer and a sealant layer in this order, wherein:
the sealant layer comprises at least one resin selected from the group consisting of polyolefins, cyclic polyolefins, carboxylic acid-modified polyolefins, and carboxylic acid-modified cyclic polyolefins,
the coating layer is configured to have a single layer or multiple layers formed of a cured product of a resin composition consisting essentially of a thermosetting resin and a curing accelerator,
the thermosetting resin is at least one selected from the group consisting of an epoxy resin, an amino resin, an acrylic resin, a phenol resin, an unsaturated polyester resin, a polyimide resin, and an alkyd resin,
the curing accelerator is at least one selected from the group consisting of an amidine compound, a ketimine compound, a hydrazine compound, a sulfonium salt, a benzothiazolium salt, and a tertiary amine compound,
the laminate has a piercing strength of 5 N or more as measured in accordance with JIS 1707:1997, and
the coating layer has a dielectric breakdown voltage of 1.0 kV or more as measured in accordance with JIS C2110-1.

* * * * *